United States Patent [19]

Russell et al.

[11] Patent Number: 4,870,971

[45] Date of Patent: Oct. 3, 1989

[54] TRANSMIT FOCUS GENERATOR FOR ULTRASOUND IMAGING

[75] Inventors: Robert H. Russell, Manhattan Beach; Lawrence D. Acker, Anaheim, both of Calif.

[73] Assignee: North American Philips Corporation, New York, N.Y.

[21] Appl. No.: 306,266

[22] Filed: Feb. 1, 1989

Related U.S. Application Data

[63] Continuation of Ser. No. 82,247, Aug. 5, 1987, Pat. No. 4,841,492.

[51] Int. Cl.[4] .................. A61B 8/00; G01N 79/00
[52] U.S. Cl. ................... 128/661.01; 73/625
[58] Field of Search .................. 128/660.01, 660.08, 128/661.01; 73/625

[56] References Cited

U.S. PATENT DOCUMENTS 4,611,494 11/1984 Uchiyama .............. 128/661.01 X
4,653,000  3/1987 Matsumoto .................. 128/660

*Primary Examiner*—Francis Jaworski
*Attorney, Agent, or Firm*—Jack E. Haken

[57] ABSTRACT

A transmit focus generator circuit for pulsing an array of transducers in an ultrasound pulse echo imaging system for transmission of a focused beam of coherent ultrasound energy. A system clock is separated into eight phases. Focusing is achieved by controlling the clock phase delay and burst delay of transmission from each transducer element. Precalculated waveform parameters are stored in a system memory. For each line scan, registers in a transmit focus block for each transducer driver circuit are loaded with the waveform parameters. For each transducer element within the aperture for a particular line scan, the circuit controls the output of pulses to achieve a focused wavefront.

7 Claims, 6 Drawing Sheets

TRANSMIT FOCUS GENERATOR FOR ULTRASOUND IMAGING

This is a continuation of application Ser. No. 082,247, filed Aug. 5, 1987 and now U.S. Pat. No. 4,841,492.

CROSS REFERENCE TO RELATED APPLICATION

This application is related to an application entitled "APODIZATION OF ULTRASOUND TRANSMISSION", R. H. Russell, inventor, filed simultaneously herewith on Aug. 5, 1987 and now U.S. Pat. No. 4,841,492 and incorporated herein by reference.

BACKGROUND OF THE INVENTION

1. Field of the Invention

The invention pertains to medical ultrasound imaging systems which utilize an array of transducer elements to transmit ultrasound energy. In particular, it pertains to a pulse generator circuit which enables an array of transducer elements to transmit a focused beam of coherent ultrasound energy and to control the amplitude of the pulses transmitted from each transducer element.

2. Description of the Prior Art

A typical ultrasound imaging system used for medical imaging includes at least one ultrasound transducer, usually in the form of an array of transducer elements. The transducer is usually connected to transmitter stage circuitry, receiver stage circuitry and whatever devices may be necessary to effect mechanical scanning of the transducer. The transmitter stage comprises a generator of electrical excitation signals which are sent to the transducer. The transducer converts these signals into periodic pulse trains of ultrasound mechanical energy.

Transducer arrays used in medical imaging systems come in many forms, such as linear arrays, phased arrays, annular arrays and collimated image arrays. A transducer array usually consists of a plurality of transducer elements disposed on a surface in some designed arrangement such as a row, matrix or other geometric pattern. The individual elements or groups of elements are actuated or pulsed in sequence to transmit a beam of ultrasound energy at a target. Ultrasound echoes are returned from the target and may be received on the same transducer elements. The pulse echo data received is then interpreted and displayed to produce an image.

In the technology of medical imaging with ultrasound, the principles of the linear array and the phased array are well known, though the technical terminology can be semantically misleading. For the purposes of this application, the following definitions will be used. A linear array is an electronically scanned array of similarly sized and shaped elements arranged in an extended line, side by side. A group of contiguous transducer elements are electronically selected from the extended array, are pulsed for transmission and then sometimes used for reception of resultant echoes. The selected group of transducer elements is then commutated one or more positions along the array and the process repeated to scan successive parallel regions in the body. A linear array projects beams of ultrasound energy perpendicular to the face of the transducer element. The image format is usually rectangular.

A phased array refers to a short linear array of transducer elements, the transmitted energy being deflected from the normal perpendicular beam by inserting delays in the pulse signal to each element. Similarly the received pulse echo is steered in angle by inserting delays in the signal path from each angle before summation. The resulting image is pie-shaped and accomplishes the so-called sector scan.

Electronic focusing of both types of arrays is possible by a different set of time delays. By introducing time delays, focusing or phasing is possible to improve lateral resolution over a particular depth range inside a target. Focusing improves lateral resolution (beam width) in the focal zone and it improves sensitivity because of higher energies produced in the focal area.

The performance of transducer arrays has been improved by the use of controlled delay elements which produce electronic focusing in the reception of pulse echoes. In these systems, each transducer element receives pulse echo signals from many points in the target. Signals which are received by the individual elements are appropriately delayed and summed. In general, focusing over a large focal zone is accomplished quite easily in the receive mode since the echo arrival time to the center element can be used to prescribe the corresponding set of time delays of other elements in the system. Dynamic focusing may also be utilized for reception of pulse echo signals.

Most modern pulse echo ultrasound imaging systems utilize a linear transducer array and employ dynamic electronic focusing during signal reception. Most linear array transducer systems also employ a fixed focus during pulse transmission. The axial resolution of such an array depends on the length of the pulse. Resolution in the transverse plane depends on the elevational dimension of the array. The focusing is usually achieved using a fixed mechanical lens.

The prior art has made some attempts to introduce horizontal (longitudinal) focusing at the transmitter stage of an ultrasound imaging system. In the transmit mode time delays have been used to steer beams by constructive and destructive interference of all pulsed signals. Whether in the transmit mode or the receive mode, these prior art time delays are frequently implemented in analog circuits, which trigger an oscillator, or by the analog delay of an existing pulse train. However, the use of analog delays introduces jitter in transmission, cross-talk and other forms of time noise.

SUMMARY OF THE INVENTION

The object of the present invention is to provide a transmit focus generator circuit for use with an array of transducers in an ultrasound pulse echo imaging system that enables a group of transducer elements in said array, when subgroups are pulsed sequentially, to transmit a focused beam of coherent ultrasound energy. To achieve this object, particularly for Doppler analysis, the signals applied to the transducer elements have to be coherent to a very high degree with a reference frequency, requiring essentially that all transmitted frequencies be locked in phase very precisely to a master oscillator.

The invention will be described and illustrated in terms of an embodiment used with a linear transducer array.

The objects of the present invention are achieved by providing for each transducer element of a transducer array, and for the array itself, precise digital control over the transmission of pulses. The technique implemented in the present invention is to utilize a clock, or carrier signal, which has been separated into many coherent phases at the system level and to provide for the loading, storage and utilization of preselected and/or precalculated waveform parameters for each transducer element for each scan line in system memory. These waveform parameters are the burst delay or number of cycles that transmission is delayed from a particular element; the clock phase at which transmission begins from that particular element; and the burst length, or number of pulses transmitted from that element in the aperture. A coarse control over the time delay is achieved by controlling the number of clock cycles of delay prior to transmission, the burst delay. The fine control is then achieved by phase delay, that is, selection of the clock phase at which transmission begins. The burst length transmitted is usually the same for all active elements. A further parameter utilized in the present invention is whether or not a transducer element is active, in the aperture, for a given scan.

The present invention provides for each transducer element in a transducer array a control circuit, hereinafter called the transmit focus block. Each transmit focus block has a plurality of control registers which receive and store waveform parameters for a scan and from which the system selects the waveform parameters for that transducer element to generate a particular wavefront, namely the burst delay, the clock phase delay, and the burst length. The transmit focus block also receives multiple phases of the system clock on a phased clock bus and various control signals on a control bus. In addition, the entire system has a means for loading the parameter data in the control registers of all transmit focus blocks, thereby controlling a sequence of line scans for the linear array of transducer elements. In the preferred embodiment waveform parameter information is loaded and shifted serially via a data bus into the set of control registers of each transmit focus block of each transducer element for the entire transducer array to select the desired clock phase, delay, and burst length for a scan. For succeeding scans this data is shifted one or more blocks along the sequence of transmit focus blocks. Typically, the phase and delay information to be utilized in the generation of a focused wavefront will be different from element to element across the array. Using control signals which select the stored waveform parameters, the transmit focus block controls the output of pulses to a power source through an output gate. Each transmit focus block selects the clock phase delay and has a counter to tally the selected number of pulses (burst delay) of the chosen clock phase before the output gate is opened. A bistable device controls the state of the output gate, either open or shut. A second counter tallies the output of pulses and closes the output gate when the desired number of pulses has been outputted from that transmit focus block. The system of the invention then comprises a system clock pulse generator, a set of transmit focus blocks, one for each transducer element in an array, and a means of loading and shifting the data and control signals which control the transmission of ultrasonic pulses from the array of transducers for the generation of a focused wavefront.

The process for the generation of a structured wavefront begins by a system selection of a register set in system memory containing the waveform parameter data previously calculated to create the wavefront, and the serial loading and shifting of that data into the set of control registers in each transmit focus block. The system starts its multiphase clock. At this time all output gates of the transmit focus blocks are closed, all waveform parameters have been selected and loaded into the string of transmit focus blocks. With the starting of the clock, a clock phase already selected for each transmit focus block begins to count down the delay counters of all the transmit focus blocks from a preset. As the tally of each delay counter for each transducer element reaches zero, a latch controlling the output gate for that transducer element is set and the output gate is opened to allow outputting of pulses of that particular clock phase chosen for that particular transducer element. An output counter tallies the outputted pulses. When the number of pulses outputted reaches the preselected number for that transducer element, the latch is reset and the output gate is closed. (A flag is used to indicate that a particular channel controlling a particular transducer element outside the aperture for a given line scan is not to output a pulse train at all. This represents a disabled, or unused, channel for this particular wavefront.) The transmitting process for that particular transducer element for that particular wavefront is concluded.

The delay in transmission from transducer element to transducer element is under system program control, the data being stored in the control register set of each transmit focus block. All elements are triggered simultaneously, with appropriate programmable time delays for each element prior to the commencement of transmission from that particular element.

In the present invention the control register data (the waveform parameters stored in the registers of the transmit focus blocks) can be manipulated by lateral shifting from the control register set in one transmit focus block to the control register set of the next transmit focus block. By this means a given type of waveform profile may be generated repeatedly across the linear array of transducers, allowing development of conventional linear array scan lines.

DESCRIPTION OF THE PREFERRED EMBODIMENT

The present invention pertains to a method of and a circuit for transmitting a focused beam of coherent ultrasound, utilizing an array of ultrasound transducers, accomplishing precisely timed delays and capable of coherent pulse trains over a wide range of burst lengths.

The invention will be described in the context of a system for ultrasound medical imaging, and specifically in terms of digitally controlling a linear array of transducer elements to transmit a focused wavefront of ultrasound energy. The transmission frequency is synchronous with a reference frequency which originates in the system clock. The burst length of the transmitted signal and the burst delays required for adequate focusing for a given line scan at a given aperture are precalculated and stored in the system memory.

Figure 1:
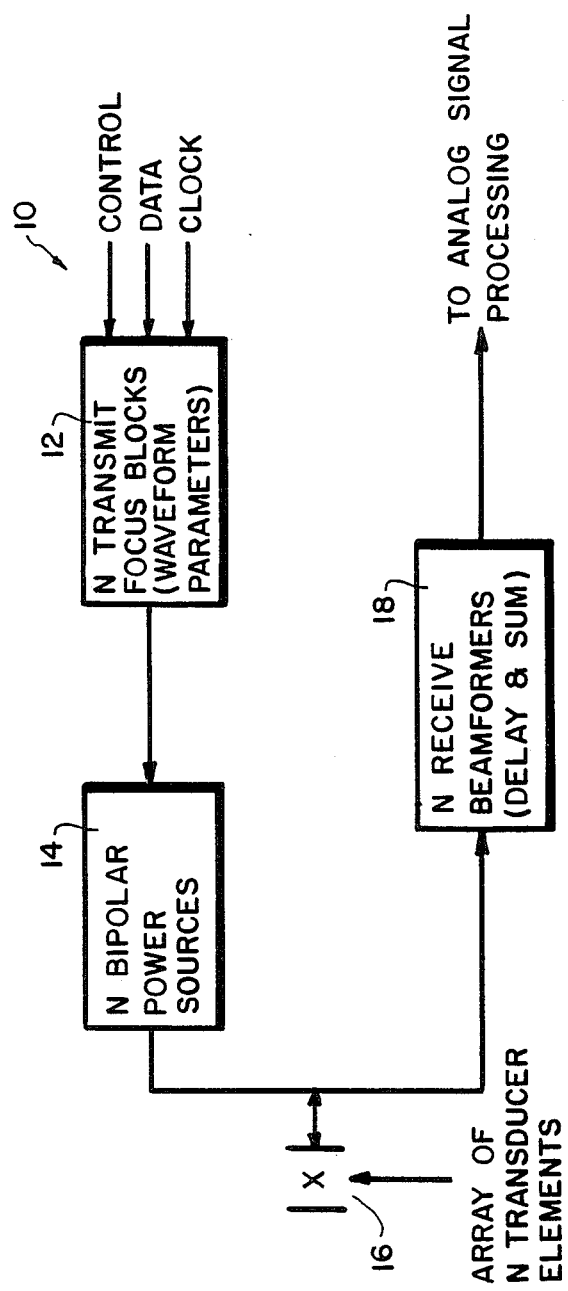
FIG. 1 is a simplified block diagram of the "front end" of a medical ultrasound imaging system.

Turning now to the drawings, FIG. 1 is a simplified block drawing of the "front end" 10 of an ultrasound medical imaging system which incorporates the present invention. In the system of the present invention, a linear transducer array 16, having N transducer elements, is connected to both a transmit stage of the system having N power sources 14 and N transmit focus blocks 12, and a receive stage having N beam formers 18. In this system the parameters for the generation of each line scan are precalculated and stored in the system memory. Prior to the generation of each line scan, the type of line scan and the specific parameters for that scan are designated the transmit focus block, for using selected waveform parameters to enable a subset of elements in array 16 of N transducer elements to transmit a focused beam of coherent ultrasound, thus generating a focused wavefront. These parameters for each transducer element include the clock phase of the transmission, the burst delay time to output a transmission and the burst length or number of pulses to be outputted in a transmission. Lateral focusing is achieved by introducing precise digitally controlled time delays in the transmission of pulses from each transducer element. A coarse control is provided by the burst delay and a fine control is provided by the clock phase.

Typically, the phase and delay information utilized in the generation of a focused wavefront will be different from transducer element to transducer element across an array 16 of transducers. The data presented in Table 1 illustrate a typical example of this. In Table 1, the delay and phase requirements for a thirty element lens at 88 mm focal distance and 3.0 MHz frequency are presented. Since the wavefront has symmetry about its center line, only one-half of the elements need to be presented in the tabulation.

TABLE 1

FOCS: 88 MM N: 30 f-3.0 MHz

| ELEMENT | TIME (nS) | PHASE DELAY (CYCLES) | CLOCK PHASE | CLOCK DELAY (CYCLES) |
|---|---|---|---|---|
| 1 | 434 | 1.30 | 2 | 1 |
| 2 | 430 | 1.29 | 2 | 1 |
| 3 | 422 | 1.27 | 2 | 1 |
| 4 | 409 | 1.23 | 2 | 1 |
| 5 | 393 | 1.18 | 1 | 1 |
| 6 | 373 | 1.12 | 1 | 1 |
| 7 | 347 | 1.04 | 0 | 1 |
| 8 | 318 | 0.95 | 0 | 1 |
| 9 | 285 | 0.86 | 7 | 0 |
| 10 | 248 | 0.74 | 6 | 0 |
| 11 | 206 | 0.62 | 5 | 0 |
| 12 | 161 | 0.48 | 4 | 0 |
| 13 | 111 | 0.33 | 3 | 0 |
| 14 | 58 | 0.17 | 1 | 0 |
| 15 | 0 | 0.00 | 0 | 0 |

This information for each transducer element for each line scan is precalculated and stored in a waveform parameter register set in the system memory. The present invention implements the concept of transmitting a focused wavefront by locating the waveform parameters for each transducer element in a corresponding register set in the transmit focus block 12.

Figure 2:
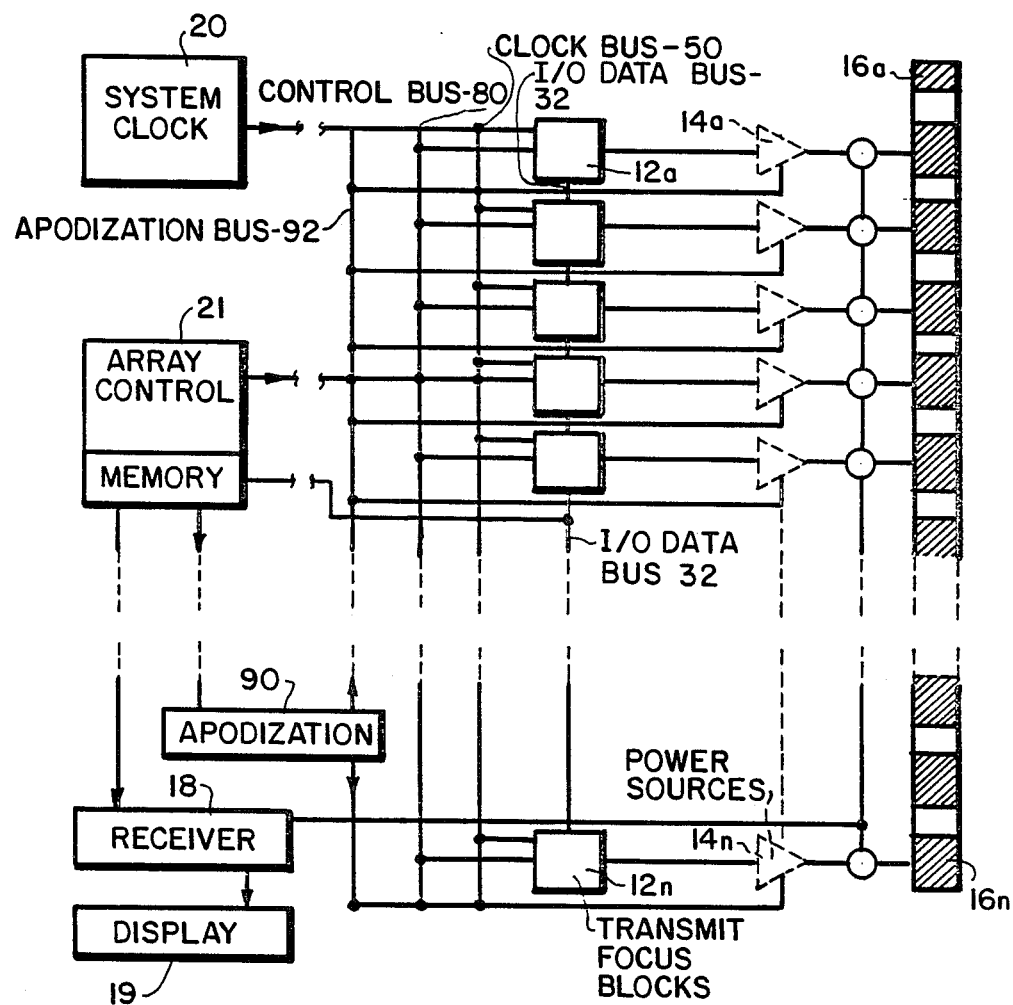
FIG. 2 is a more detailed partial block diagram of the "front end" of FIG. 1 showing the interconnection of the subsystems relevant to the present invention.

FIG. 2 is a partial block diagram of the "front end" 10 of a system embodying the present invention. In FIG. 2, each of N transducer elements 16a,...,16n is connected to a power source represented by drivers 14a, ..., 14n, which are connected to transmit focus blocks 12a ... ,12n, which store the waveform parameters. A system clock 20 separates the clock signal, or carrier frequency, into eight coherent phases which are locked in phase to a master oscillator. A phased clock bus 50 carries the eight-phase clock signals to each transmit focus block 12a, ... ,12n. The system array control electronics 21 controls the serial loading and shifting of waveform parameters to each transmit focus block 12a, ... ,12n over serial input/output (I/O) data bus 32 and the dispatch of control signals over control bus 80. The system in which the present invention is used also includes aperture apodization, which is disclosed in the co-pending cross-referenced application. For the purposes of this application, the apodization control circuit 90 sends a string of apodization signals over bus 92 to each power source 14a, ... 14n. Receiver 18 and display 19 do not pertain to the present invention.

Figure 3:
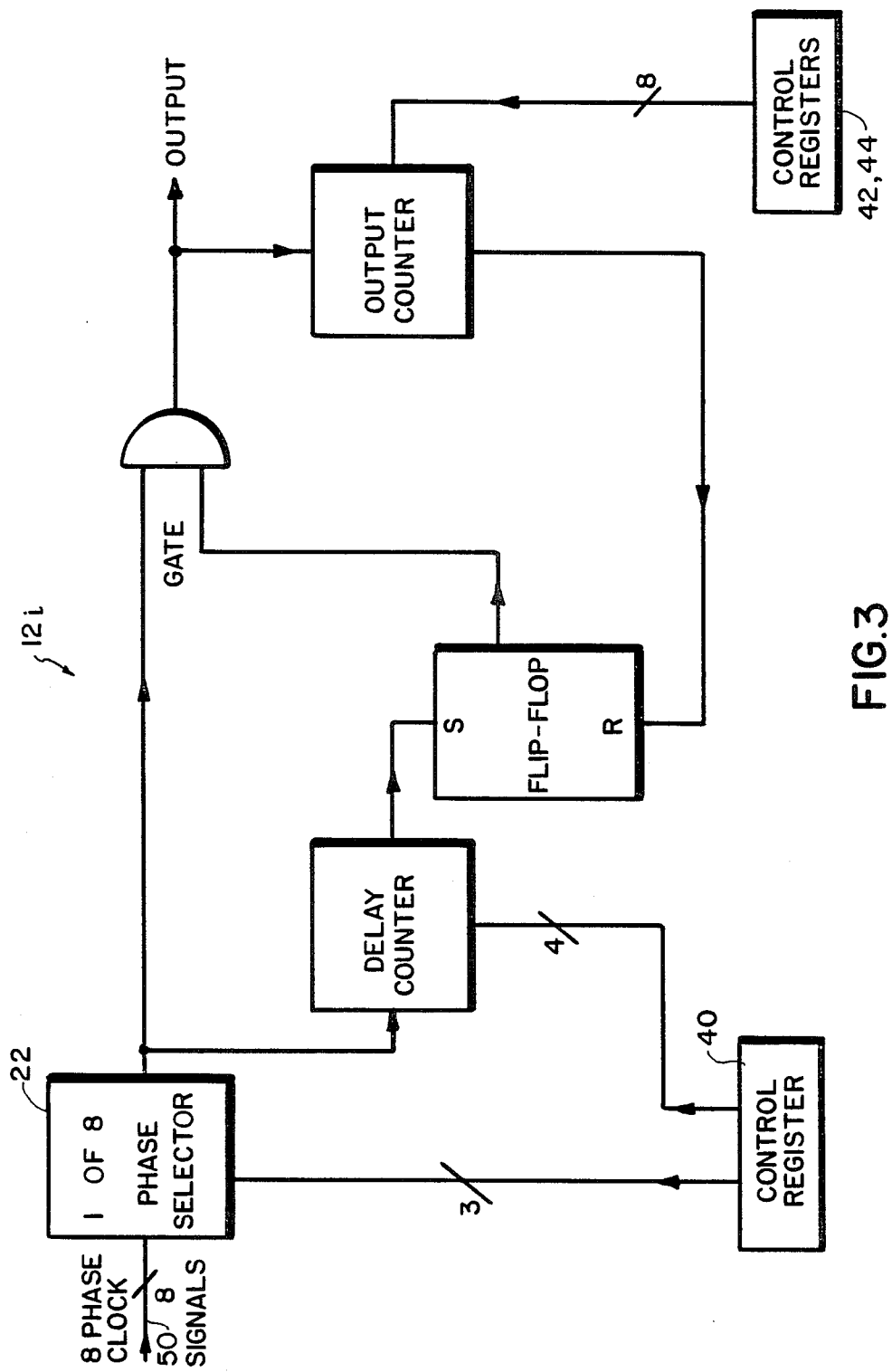
FIG. 3 is a block diagram of the transmit focus block of the present invention.

FIG. 3 is a simplified block diagram of the preferred embodiment of a transmit focus block circuit 12i of the present invention. Each transducer element 16i of a transducer array 16 is controlled by its own transmit focus block 12i and the programmed operation of a plurality of these transmit focus blocks 12 is used to create a focused wavefront of ultrasound energy. Three control registers 40, 42, 44, described and illustrated in detail with reference to the circuit shown in FIGS. 4A, 4B, contain the precalculated and preloaded waveform parameters for transducer element 16i for a particular wavefront, which are the selected clock phase, the burst delay or the number of cycles the output is to be delayed, and the burst length or the number of pulses to be outputted. All of these parameters must be specified if the element 16i is a transmitting element, within the aperture, for a particular scan. The invention also includes a means of loading and shifting said waveform parameter data in the control registers. These aspects of the disclosure will be described in detail with reference to the circuit of FIGS. 4A, 4B.

The incoming clock or carrier signal on clock bus 50 from the system clock 20 has, in the preferred embodiment, eight coherent phases which are synchronous with the provided carrier frequency. Each transmit focus block 12i has a one-of-eight phase selector 22 to allow selection of one of the eight phases of the carrier frequency, based on the waveform parameters stored in control register 40. The selected phase is one input to an output gate 24, provided to control the counter 26, which receives the precalculated burst delay also from control register 40, is used to tally a selected number of cycles of the chosen clock phase before the output gate 24 is opened. When the delay counter counts down to zero, it provides the second input to output gate 24, via a bistable device (flip-flop) 28 which is used to control the state of the output gate either open or shut. A second counter 30, which receives the burst length from control register 42 or 44, is provided to tally the outputted pulses and to close the output gate 24 when the selected number of pulses has been outputted.

Figure 4A:
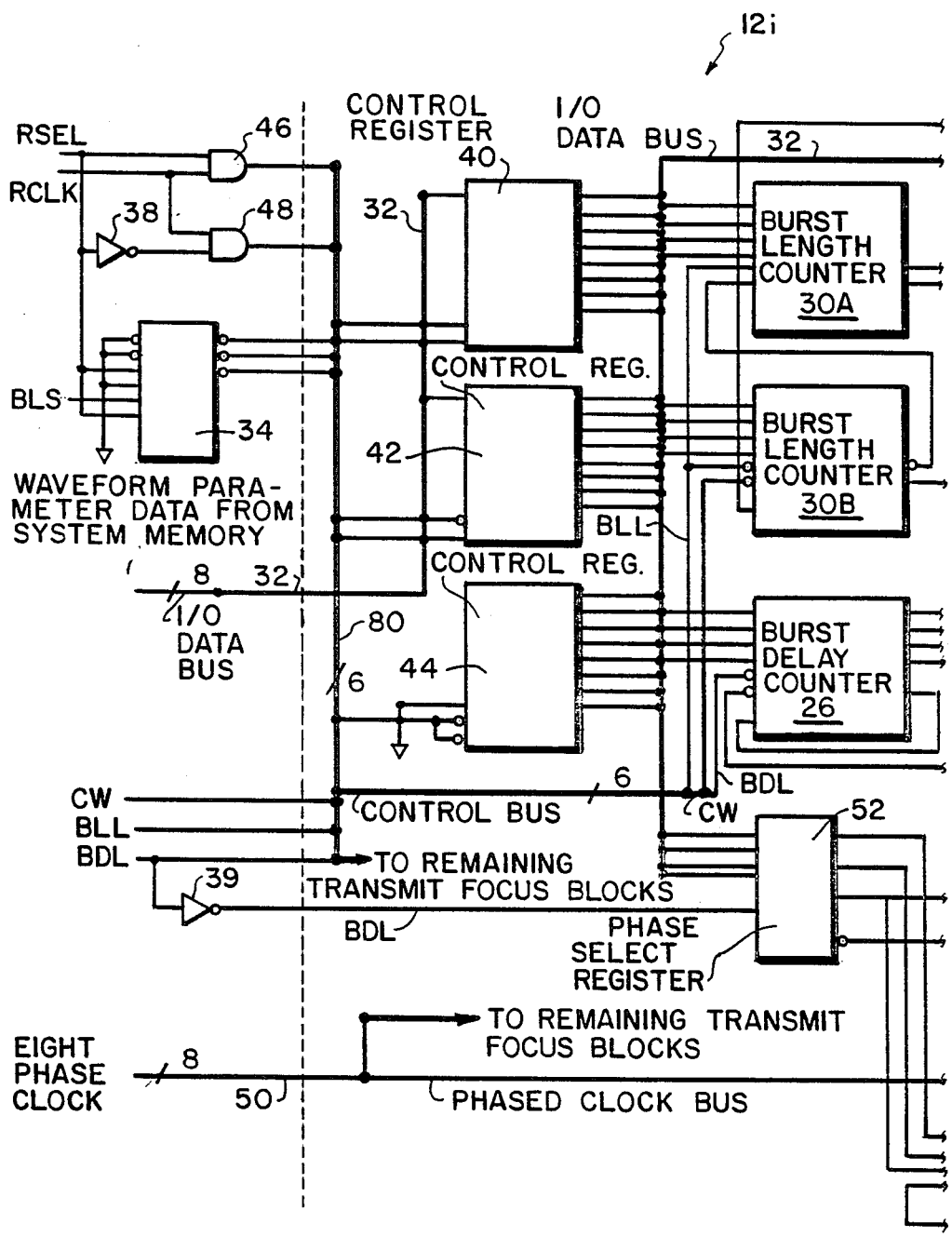
FIGS. 4A and 4B show a detailed circuit diagram of the transmit focus block of the present invention.
Figure 4B:
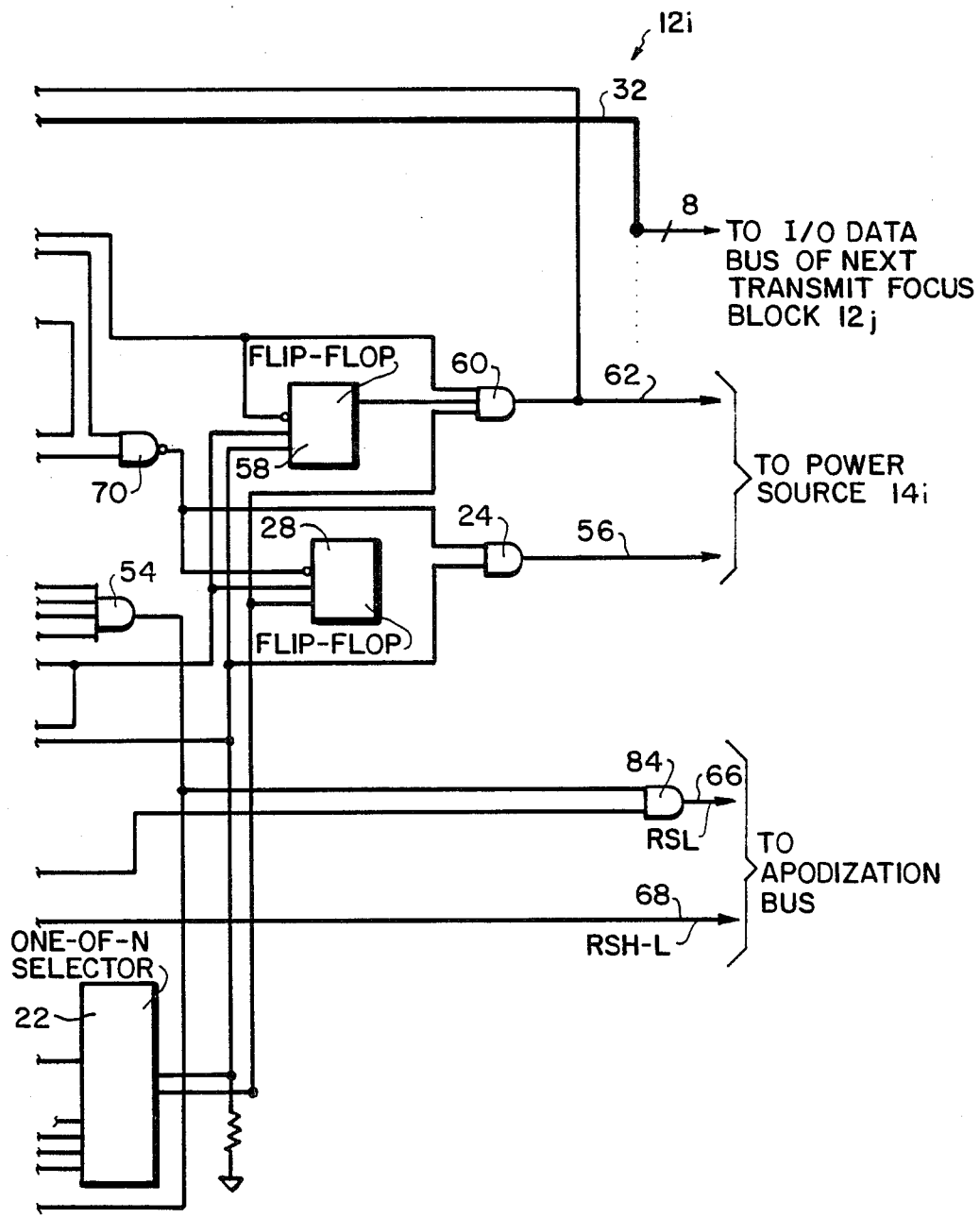

FIGS. 4A, 4B, together show the circuit diagram of the preferred embodiment of a transmit focus block 12i of the present invention. The left half of the circuit is in FIG. 4A and the right half is in FIG. 4B. The function of the transmit focus block 12i is to select for transducer element 16i a particular phase of an multiphase clock, delay that clock phase for a given number of clock cycles and then output the same clock phase for a selected number of cycles. The waveform parameter data are loaded into control registers in the transmit focus block 12i from the system memory via the array control electronics 21 prior to the transmission of each scan line.

Referring again to FIG. 4A, there are three control registers in a transmit focus block 12$i$, two shift registers 40 and 42 and one read-only register 44. The loading and shifting of the waveform parameters, clock phase, burst delay and burst length, is by digital input to two control registers 40, 42 of the transmit focus block 12, the input arriving on a serial input/output data bus 32. (A serial data bus has been chosen for design purposes unrelated to the present invention.) The inputs of the two control shift registers 40, 42 are connected input to control register 44 which is a ROM is a control input from register selector 34. The outputs of all three registers 40, 42, 44 are three-state and connected in parallel to serial data bus 32. The control register output of every transmit focus block 12$i$ on data bus 32 is the input on data bus 32 of the next following transmit focus block 12$j$ for the serial shifting of data from the first transmit focus block 12$a$ to the last one 12$n$. The data bus 32 of the last transmit focus block 12$n$ in the chain is left unconnected on the output side of the control registers. By this means, two sets of control shift registers 40, 42 (register 44 is a ROM) are provided across the full length of the string of transmit focus blocks 12. A register selector 34 is provided to enable the system wide selection of any set of control registers 40, 42, 44 in the transmit focus blocks 12 of the system to be active on input data bus 32 and output data bus 36 system wide. By selection of a particular control register set system-wide, data can be loaded and shifted serially (or simply read in the case of control register 44) in one control register string independently of the other control register string. Appropriate circuitry 38, 46 and 48 and a control bus 80 are provided for clocking and the writing of data to the two control shift registers 40, 42. The signals RSEL (register select) and RCLK (register clock) select and clock the input of parameter data to the set of control registers 40, through inverter 38, gate 48, register selector 34 and input data bus 32. The signal BLS (burst length select) selects the set of control registers 44, which are ROMs, through register selector 34 to be active system wide if the burst length is to be two. Otherwise, the signals RSEL, RCLK and BLS select and clock parameter input data from data bus 32 into the set of control registers 42 through gate 46 and register selector 34. The actual loading of data into the counters 26, 30A, 30B is commenced by the signals BLL (burst length load) and BDL (burst delay load) on control bus 80. The signal BDL is inverted in inverter 39 and also sent to the phase select register 52 discussed later. The input for data bus 32 of the first transmit focus block 12$a$ in the chain is sourced from the array control electronics 21 of the ultrasound imaging system, FIG. 2.

The data to be inputted to the set of control registers 40 and 42 are the waveform parameters for a preprogrammed focused wavefront for each ultrasound scan line. Control register 40 receives the burst delay count in bits 0 to 3 and the clock phase select in bits 4 to 6. Bit 7 of control register 40 is a programmed control bit which will be discussed later. For elements outside the aperture and hence non-transmitting for a particular scan line, the burst delay field contains a state which inhibits the output from those elements and the phase select field contains an apodization bit. Control register 42 receives the burst length or output pulse count data. Control register 44 is a read-only register in which two bit positions are used to prestore the frequently used output pulse count of two. The remaining bit positions in control register 44 are used for purposes not related to the invention.

The eight-phase clock signals 20 are inputted on the phased clock bus 50 to all transmit focus blocks 12 in parallel. In each transmit focus block 12$i$, a single clock phase is selected by a one-of-eight selector 22, under the with bits 4, 5 and 6 of control register 40, three bits selecting one phase of the eight clock phases. The selected phase is one input to output gate 24 which controls the outputting of the selected phase after a selected delay. A burst delay counter 26 is loaded by the lower order nibble of control register 40, that is bits 0-3. These four bits allow for a maximum delay of fifteen clock cycles of the selected clock phase before the output gate 24, under control of flip-flop 28, is opened to allow the outputting of a burst of pulses. In the preferred embodiment, a maximum delay of only fourteen cycles is used. The state of 1111 (15) is a special case decoded by a gate 54, connected to the output disable pin of one-of-eight phase selector 22. This state is used to inhibit the output of any signal by that particular transmit focus block 12$i$. The inverted BDL signal to the phase select register 52 controls the burst delay for the selected phase. The selection of the burst length, that is, number of pulses to be outputted, is made by a second register, either register 42 or register 44, such that the same number of pulses are outputted from all the active transducer elements in a given aperture during a given transmission. (This is not a restriction but merely chosen for the particular embodiment.) The burst delay counter 26 is counted down by the selected clock phase until the preloaded number of delay cycles have occurred. At that time the second condition of output gate 24 is satisfied. When both conditions of gate 24 are satisfied, the state of flip-flop 28 is changed and output gate 24 is opened. The clock pulses of the selected phase are outputted on the line 56 to a transducer element driver 14$i$ (FIGS. 1, 2, 3) for the particular transducer element 16$i$ in the array 16 to which the transmit focus block 12$i$ is assigned. The 4A, 4B assumes that the transducer element driver 14$i$ is a push-pull driver. Accordingly, not only are the clock pulses are outputted through gate 24, they are also outputted through gate 60. Thus, at the same time, by means of flip-flop 58 and gate 60 a one-half cycle delayed pulse is outputted on line 62 to the same transducer element driver. Counters 30A, 30B are loaded with the pulse train or burst length data stored either in control register 42 or 44, the read-only register. The number stored in control register 44 is a fixed "2". This number is given a special register since it is used most commonly and it is often desired to alternate a two pulse train with whatever pulse train length is stored in register 42. The pulses outputted by a transmit focus block 12$i$ through output gates 24, 60 on lines 56, 62 are tallied by 8-bit counters 30A, 30B, which are connected in series. When counters 30A, 30B count out, gate 70 signals this condition and the state of flip-flops 28, 58 are sequentially toggled and output gates 24, 60 are closed to further pulses, although pulses may still be present on the selected clock phase line.

A control signal CW (continuous wave) disables the burst length counters 30A, 30B, thus allowing a continuous pulse train to be outputted.

As previously noted, the state of "1111" loaded into delay counter 26 is specially decoded and is used to inhibit any clock output from a transmit focus block 12$i$ if so selected. This specially decoded state is also used in conjunction with the remaining bit of register 40, bit 7, to set the status of output lines 66 and 68 which go to the apodization circuitry which is described in the co-pending, cross-referenced application.

When it is desired to begin the generation of a begins by the selection of the set of control registers to be loaded with the waveform parameter data from the system memory previously calculated to create the wavefront. This selection is made system-wide by register selector 34. The data is loaded and shifted into control registers, 40, 42 of each of the transmit focus blocks 12. The eight-phase system clock 20 is then started. At this time all of the output gates 24, 60, 66 are closed, all phases and delays and desired number of output pulses have been loaded into control registers 40, 42, 44 by register select 34. With the starting of the clock, clock phases are selected for all transducer focus blocks 12 and the delay counters 26 begin to be counted down from a preselected number. As delay counter 26 of each transducer focus block 12i reaches zero, the bistable latches 28, 58 controlling the gates 24, 60 are set and the output gates 24, 60 are opened to allow outputting of a particular clock phase chosen for that particular transducer element. With the outputting of the clocked pulses, the output counters 30A, 30B begin to tally the pulses. When the number of pulses outputted reaches the preselected number from register 42 or 44, the bistable latches 28, 58 are reset and the output gates 24, 60 are closed. The transmitting process for each particular transducer element for that particular wavefront is concluded.

Figure 5:
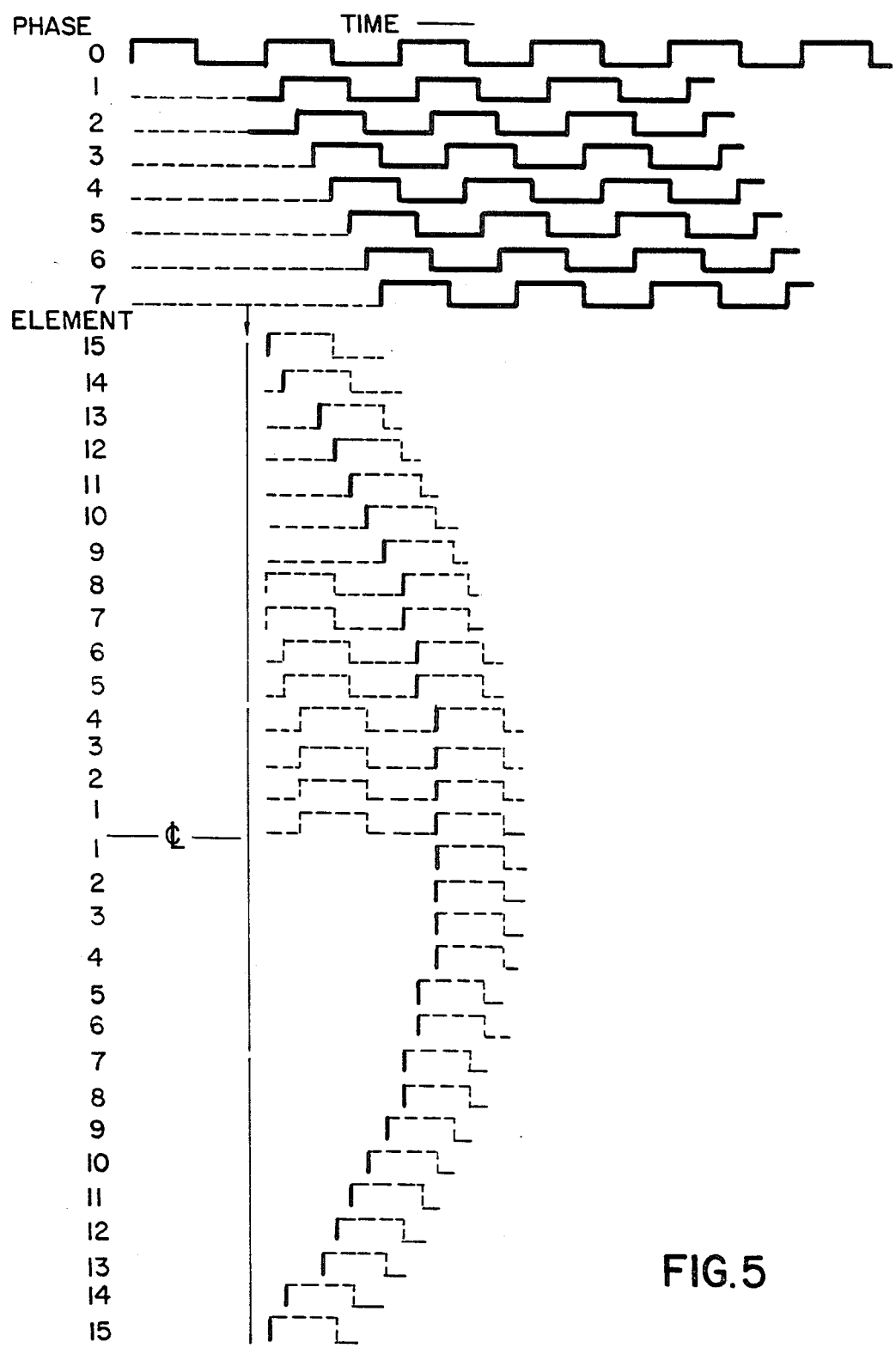
FIG. 5 is a timing diagram of a transmitted wave front buildup.

Turning now to Table 1 presented above and FIG. 5, an example is illustrated in which a spherical, focused wavefront is generated from an aperture of thirty acoustic transducer elements. Table 1 shows a suitable pattern, which may be readily calculated for any chosen focal distance. Since the wavefront has symmetry about the center line, only one half of the elements are presented in the tabulation of Table 1. These phases and delays of Table 1 are shown in FIG. 5 as transmitted by the thirty elements. It will be seen from the Figure that the desired wavefront has been generated. The effect of a limited choice of only eight phases may also be seen in FIG. 5; however such an error is insignificant in practice. It should also be noticed that the clock pulse generation in the example of FIG. 5 begins with the gating of the zero phase and then the subsequent generation of the additional seven phases. This gating may be made any time after a previous negative transition. All output gates are open with the signal in the zero, not one, state.

In the present invention it should be noted that all the transducer elements are triggered simultaneously, with appropriate programmable time delays for each transducer element, prior to the commencement of transmission from that particular element. This solves a problem which can arise when a delay in transmission of the triggering signal from element to element can be inherently too slow because propagation delays may be greater than what can be tolerated for a given wavefront system. Alternatively, the delay in transmission of the triggering signal from element to element could be developed by initiating the transmission process at each end of the array and letting the transmission progress toward the central, last to transmit elements. However, where it is desired to release more than a single element at a time the propagation delays for the triggering signal may also be greater than a permissible tolerance in such delays.

As mentioned previously, it is intended in this embodiment of the invention that the waveform parameter data will be manipulated by lateral shifting from a set of control registers in one transmit focus block 12i to a set of control registers in the next succeeding transmit focus block 12j. By this means a given type of waveform profile may be generated repeatedly across a linear array of transducers, allowing development of the usual linear array line scan. Any particular transmit focus block 12i may also be disabled so that it will not transmit an output pulse train although all other input signals are the same as for other blocks. Using the waveform parameter register sets, the system has also the capability to enter multiple apertures in a given register set for scans less than the full aperture, while retaining the simplicity of shift register data movement.

The invention has been described and illustrated in terms of a linear array transducer. It should be clearly understood that the principles of the present invention are equally applicable to phased arrays, annular arrays and other types of transducer arrays that are available within the art.

In the particular embodiment, using a linear array having 128 transducer elements, the phase and delay selection is set by seven bits (stored in an eight bit register, the spare bit being used to create apodization). The selection of the burst length or number of pulses to be outputted is made by a second eight bit register such that the same number of pulses are outputted from all elements during a given transmission, (although this is not a restriction but merely a choice for the described and illustrated embodiment).

For the embodiment described and illustrated, the burst length of the transmitted signal ranges from two cycles to one hundred cycles. The delays required for adequate focusing range up to fourteen wavelengths of the carrier frequency. None of these performance factors are limiting. Changes resulting from different performance factors should be obvious to one skilled in the art.

It should be noted that transmit delays are not limited to up to fourteen wavelengths or cycles, but may be of virtually unlimited length and may be as accurately timed as the reference clock. There is essentially no degradation of the master clock accuracy with the generation of the wavefront beam. Lateral or semi-automatic triggering of the successive delays is practical at either lower frequencies, higher beam angles or with faster devices.

The basic concept implemented in the present invention is that of locating in a set of registers at each transducer element the ability to select and delay the desired phase of a reference clock. This allows the creation of any desired wavefront, be it at an angle or straight ahead, elliptical or spherical or parabolic, or literally any wavefront that is desired. The implementation of the chosen wavefront is in the programming and coding of the phase and delay in selected registers. A phased array sweep can be transmitted just as readily as a straight ahead beam.

A secondary function of the transmit focus block is to control the potential applied to an endless loop of resistors. This voltage is used to control the amplitude of the pulses transmitted from each element, thereby achieving a desired power profile across the transmitted aperture. This secondary function pertains to apodization and is discussed further in a co-pending application.

What is claimed:

1. In an ultrasound pulse echo imaging system having at least one array of transducer elements, transmitting stage circuitry which direct scan lines of ultrasound energy to a focal zone, and array control means which can said focal zone with respect to an object, a circuit to enable said at least one array of transducer elements to transmit a focused wavefront of coherent ultrasound energy comprising:

- system clock means which produce m coherent, pulsed clock phase signals, where m is an integer greater than one;
- system memory means which store waveform parameters which specify a clock phase delay, a burst delay and a burst length for each transducer element in said at least one array for each of a plurality of desired focussed scan lines;
- a plurality of transmit focus blocks, each being connected to an associated one of said transducer elements, which apply a desired one of the clock phase signals to the associated transducer element in response to values of waveform parameters;
- a clock bus, connecting each of said transmit focus blocks to the system clock means, which supplies all of the clock signals to each of the transmit focus blocks;
- a control bus, connecting each of the transit focus blocks to the array control means, supplies control signals from the array control means to the transmit focus blocks;
- a data bus, connecting the system memory means to each of the transmit focus blocks, which sequentially loads selected waveform parameter data from the system memory means into the transmit focus blocks for each desired scan line;

wherein each of the transmit focus blocks comprises:

- a plurality of control registers which store a set of the waveform parameters, which are associated with the particular transducer element to which the block is connected, for a particular desired scan line;
- means which select one of the clock phase signals from said clock bus based on the value of a clock phase parameters stored in the control registers for application to the transducer element;
- means which delay the selected clock phase signal by a number of cycles determined by the value of said burst delay parameter stored in the control registers;
- means which apply to the transducer element a number of pulses of the selected and delayed clock phase signal which number is determined by the value of the burst length parameter stored in the control registers.

2. The circuit of claim 1 further comprising:
- a register selection circuit which select a group of the control registers which are to be active in all transmit focus blocks; and
- means for providing a set of control signals to activate the register selection circuit so that waveform parameter data from the data bus is loaded into each selected control register of each transmit focus block until all data for parameters for a desired scan line is loaded.

3. The circuit of claim 1 further comprising:
- means which select a specific register in each of the transmit focus blocks, and which enable a specific parameter stored in that register to be changed in each transmit focus block while the other parameters in those blocks remain unchanged.

4. The circuit of claim 1 wherein the means which select the clock phase signal comprise:
- a one-of-m selector connected for receiving all of the signals from said clock bus;
- phase selector means having as inputs the clock phase parameter stored in a control shift register and a control signal from said array control means which control the one-of-m selector so that the combination of said inputs causes said one-of-m selector to output one selected clock phase signal for the desired scan line.

5. The circuit of claim 1 wherein the means which delay comprise:
- first counter means having one input connected to receive said burst delay parameter stored in one of the control registers, which functions to count down a number of cycles of the selected clock phase signal which is determined by the value of the delay parameter;
- a latch which changes state upon receipt of a signal that the first counter means has counter down to zero, indicating that the delay has been completed;
- an output gate opened by the latch to operatively pass the selected, delayed clock phase signal to the transducer element.

6. The circuit of claim 5 wherein the means to output a selected number of pulses comprises:
- an output gate connected to receive the selected clock phase from said means which select;
- second counter means connected to count pulses passed by the output gate;
- means which receive a burst length parameter value from one of the control registers and apply it as a starting state for the second counter means;
- latch means which receive a signal that the second counter has reached an ending state, and which then close the output gate to operatively block the signal from the transducer element; and
- a control signal input which disables the second counter means so that the output of pulses passed to the transducer element is continuous.

7. The circuit of claim 1 further including means which store a waveform parameter indicating that a transducer element does not transmit for a particular scan line and means which thereupon disable said clock phase signals for the element for that scan line.

* * * * *